United States Patent [19]

Nash et al.

[11] Patent Number: 5,012,439

[45] Date of Patent: Apr. 30, 1991

[54] METHOD AND APPARATUS FOR PERFORMING DIVISION

[75] Inventors: J. Gregory Nash; Milos Ercegovac, both of Los Angeles; Thomas Lang, Woodland Hills, all of Calif.

[73] Assignee: Hughes Aircraft Company, Los Angeles, Calif.

[21] Appl. No.: 947,169

[22] Filed: Dec. 29, 1986

[51] Int. Cl.$^5$ .......................... G06F 7/52; G06F 7/38
[52] U.S. Cl. ............................... 364/766; 364/746.2
[58] Field of Search ............... 364/761, 764, 766, 767, 364/749, 786

[56] References Cited

U.S. PATENT DOCUMENTS

| | | | |
|---|---|---|---|
| 4,084,254 | 4/1978 | Birney et al. | 364/766 |
| 4,414,642 | 11/1983 | Grube | 364/766 |
| 4,707,798 | 11/1987 | Nakano | 364/765 |

OTHER PUBLICATIONS

C. Lemaire et al., "Improved Non-Restoring Division", IBM Technical Disclosure Bulletin, vol. 23, No. 3, Aug. 1980, pp. 1149-1151.
G. Metze, "A Class of Binary Divisions Yielding Minimally Represented Quotients", IRE Trans. on Electronic Computers, Dec. 1962, pp. 761-764.
N. Takagi et al., "A VLSI-Oriented High-Speed Divider Using Redundant Binary Representation", Trans. of IECE Japan, vol. 167D, No. 4, pp. 450-457, Apr. 1984.
Translation for Japanese Reference Entitled, "A VLSI-Oriented High-Speed Divider Using Redundant Binary Representation", by Takagi et al., Trans. of IECE Japan, vol. 167D, No. 4, pp. 450-457, Apr. 1984.
J. E. Robinson, "Theory of Computer Arithmetic Employed in the Design of the New Computer at the University of Illinois", University of Illinois Digital Computer Laboratory File Number 319, 1960.
G. S. Taylor, "Compatible Hardware for Division and Square Root", Proc. 5th Symposium on Computer Arithmetic, 1980, pp. 127-134.

Primary Examiner—Dale M. Shaw
Assistant Examiner—Long T. Nguyen
Attorney, Agent, or Firm—V. D. Duraiswamy; W. K. Denson-Low

[57] ABSTRACT

A method and apparatus for performing division which calculates a quotient from a dividend and a divisor by using recursive subtraction operations without using carry propagation for each subtraction operation. The apparatus contains a circuit (16) for generating a plurality of quotient digits from the divisor and the dividend. The apparatus also contains a circuit (18, 20) for generating the quotient from the quotient digits.

15 Claims, 9 Drawing Sheets

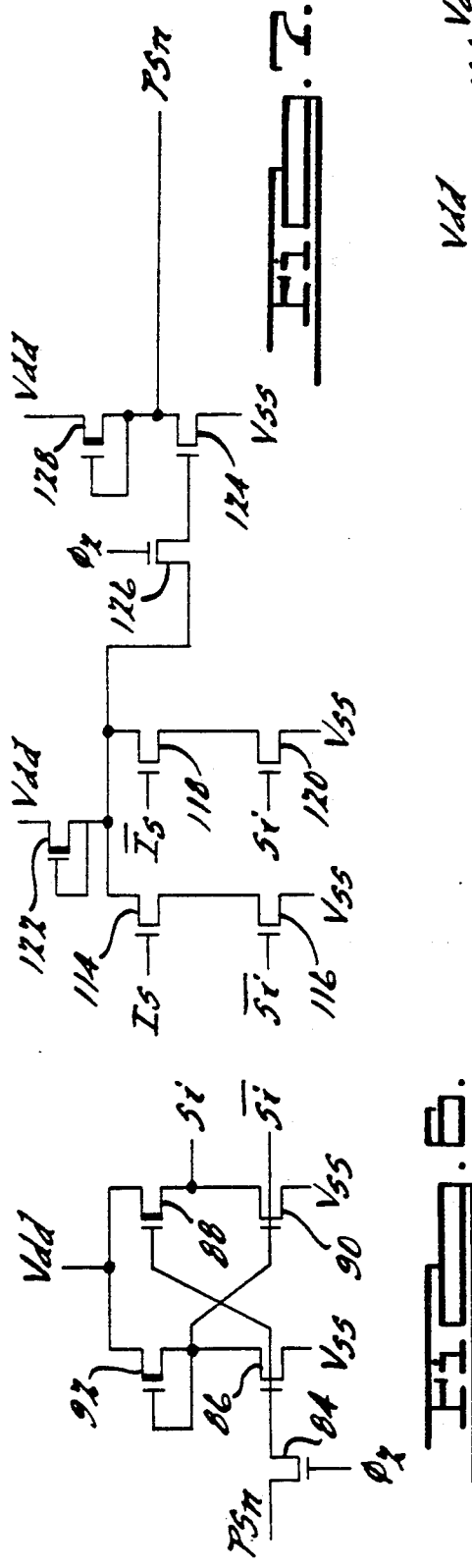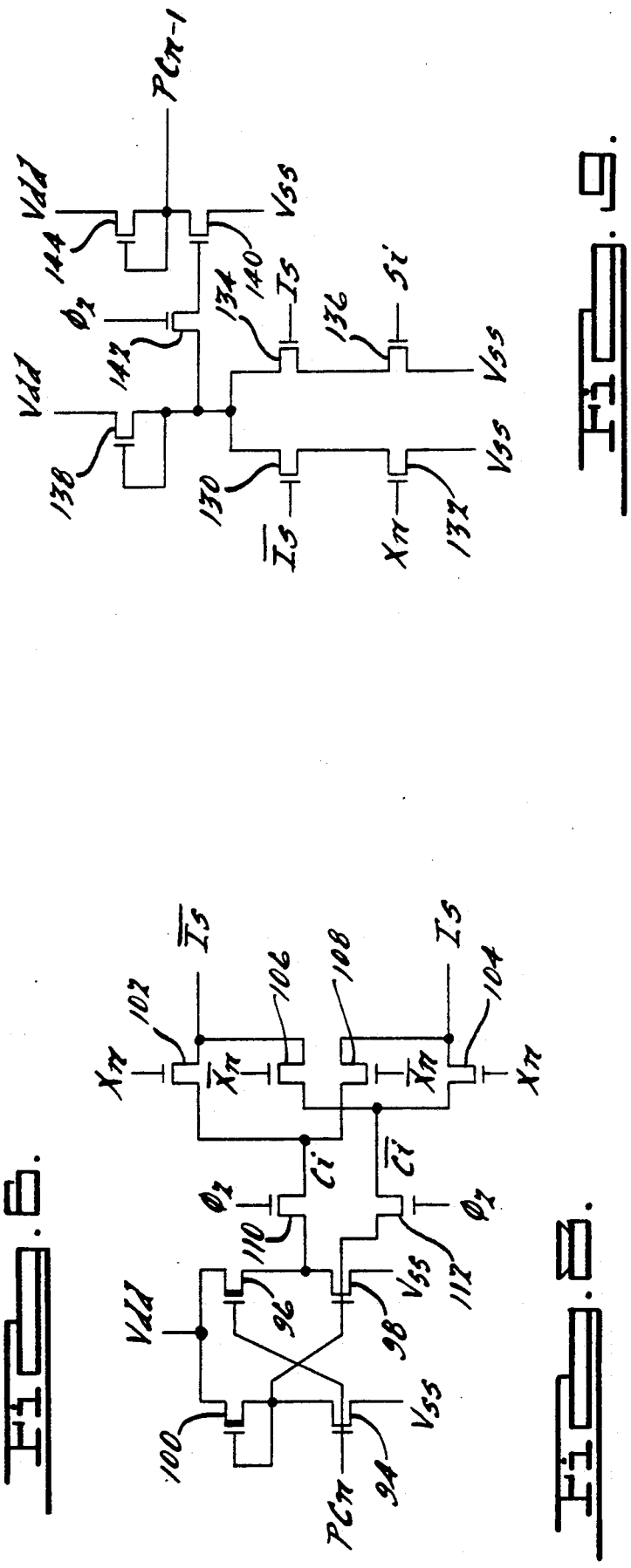

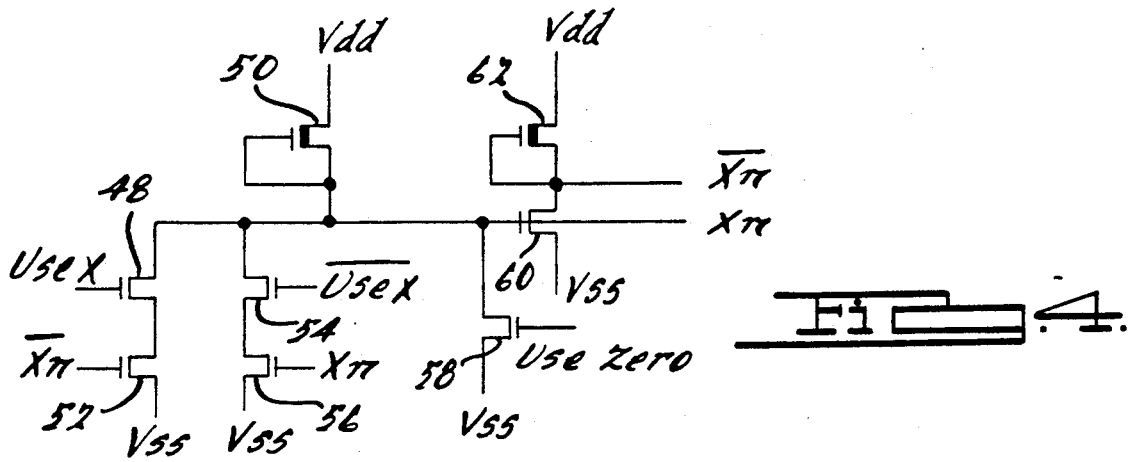
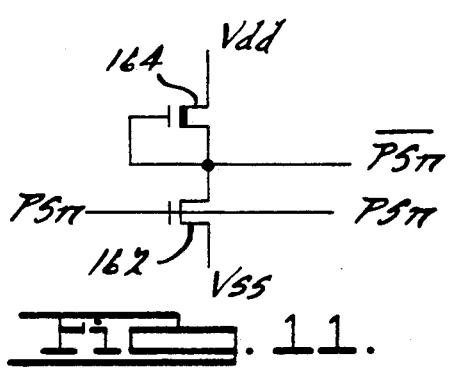
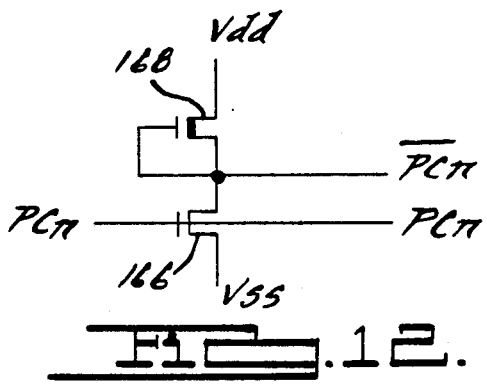
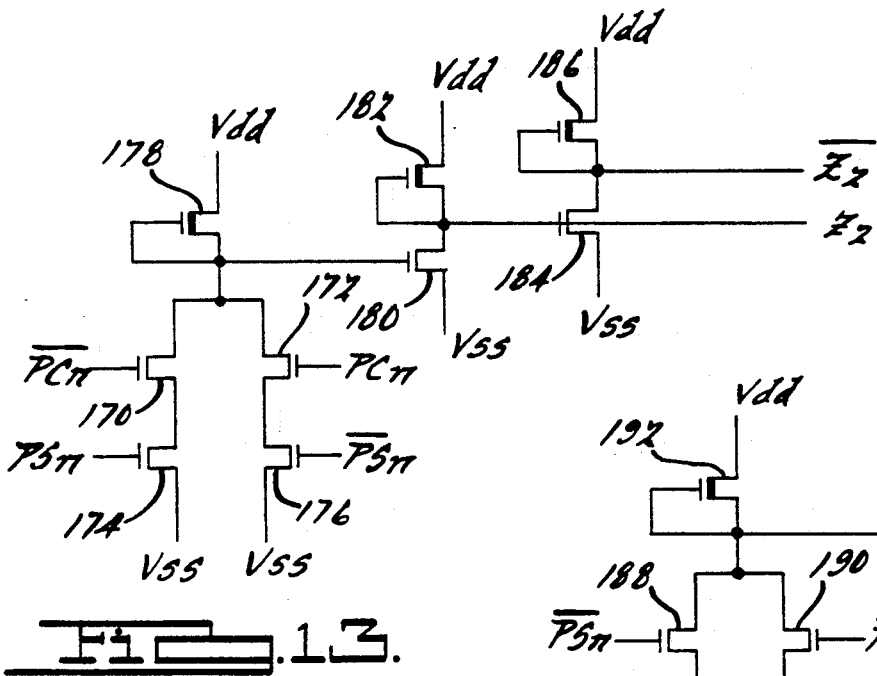
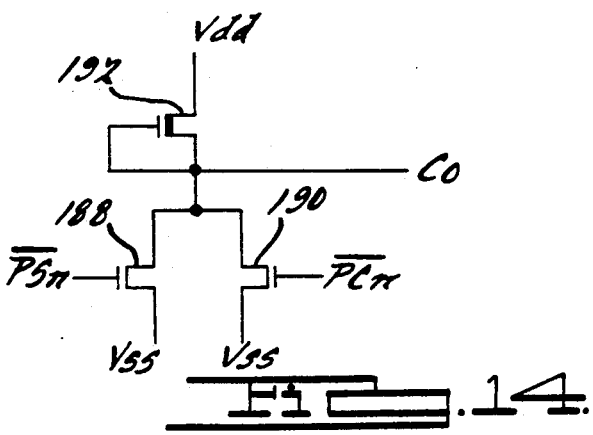

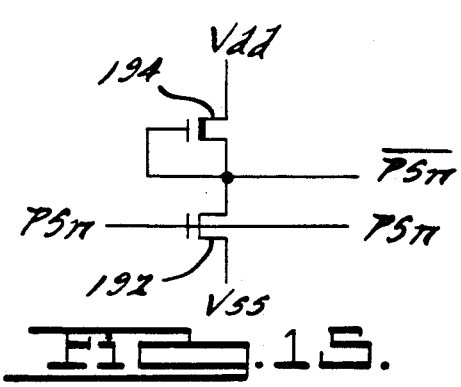
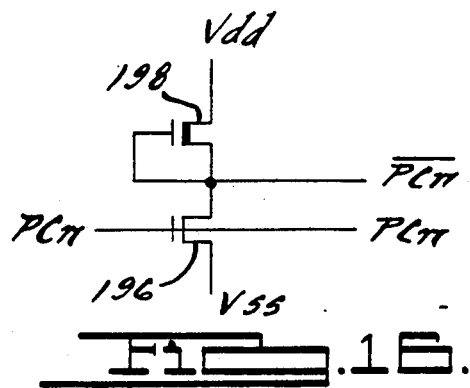
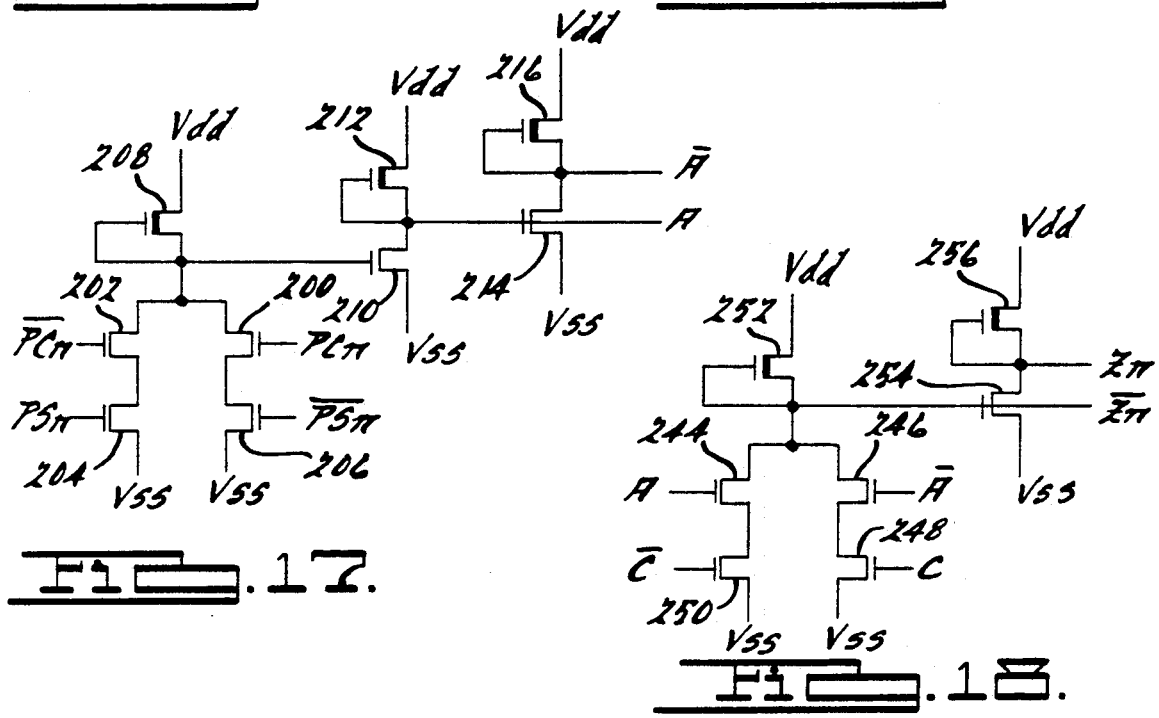
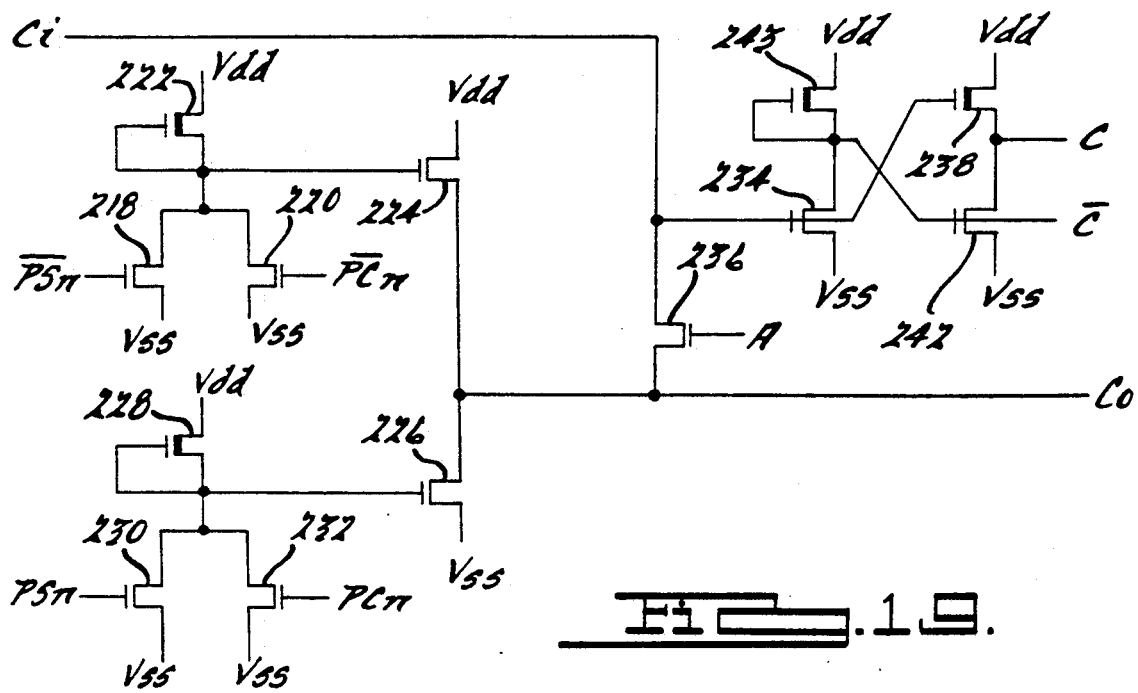

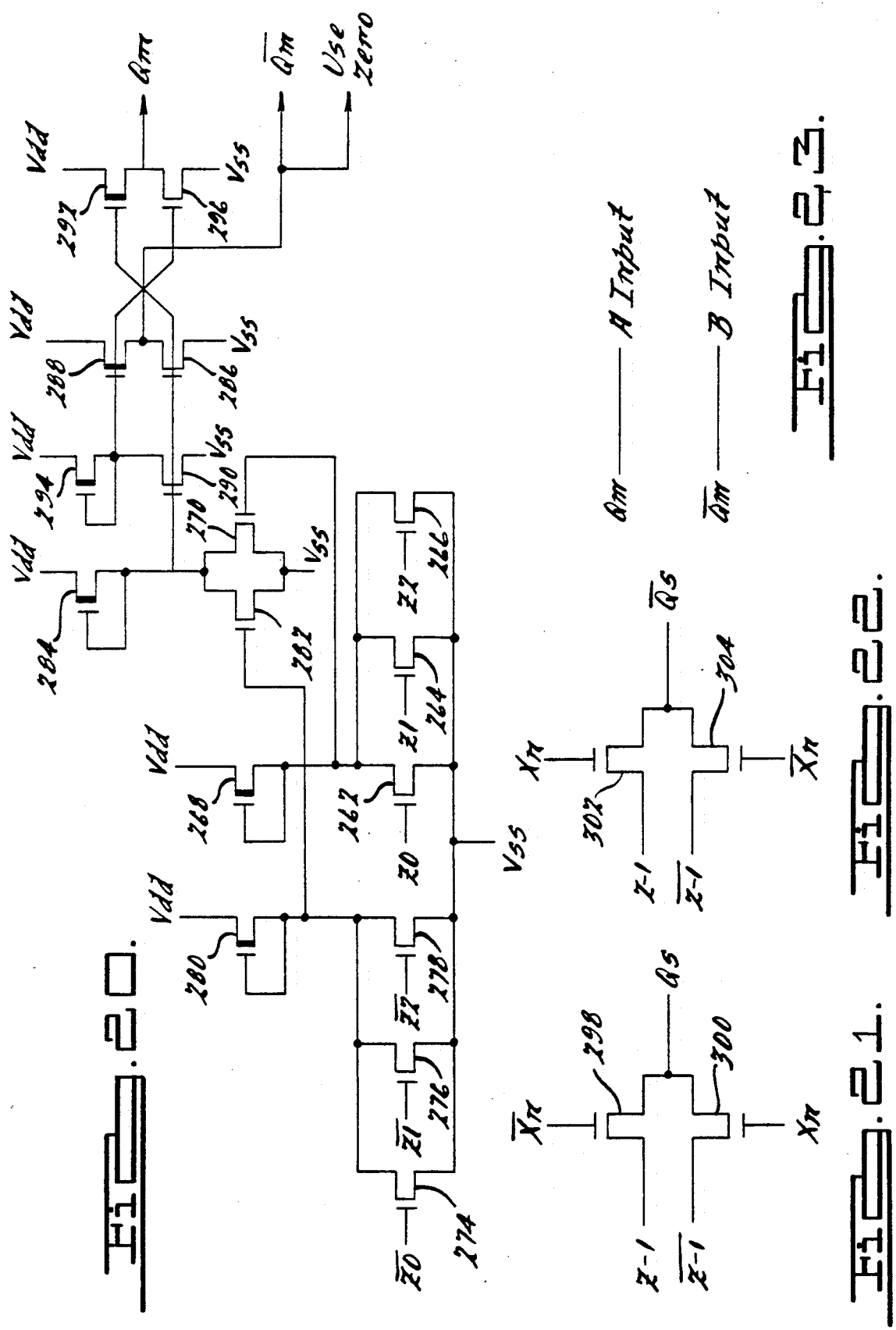

METHOD AND APPARATUS FOR PERFORMING DIVISION

BACKGROUND OF THE INVENTION

1. Field of the Invention

This invention relates to the field of integrated electronics, and more particularly to a method and apparatus for performing division.

2. Description of Related Art

Since the development of integrated circuits, much effort has been placed on reducing the area of substrate material required to form integrated circuits. By reducing the area required for a particular integrated circuit, the cost of the integrated circuit is reduced and the production yield during fabrication is increased. Of undoubtedly equal importance has been the effort made to increase the speed of integrated circuits so that computations using a particular circuit will require less time. The advantage gained from improving the speed of integrated circuits is particularly important in applications where the computations to be performed are complex and involve relatively large amounts of data.

One area where the concerns described above are of particular importance is with integrated circuits which perform recursive division operations. In integrated circuits which perform recursive division operations, the quotient is formed by a series of iterative or recursive subtraction steps. In one type of recursive division operation, the division operation requires the propagation of a carry bit across the word length of the quotient during successive subtraction steps. An example of an integrated circuit which uses this approach is embodied in the Intel 8087 coprocessor. In another approach to recursive division, the division operation requires relatively complex and slow circuitry to calculate the quotient digits. An example of this type of dividing integrated circuit is disclosed in G. S. Taylor, "Compatible Hardware for Division and Square Root", Proc. 5th Symposium on Computer Arithmetic, 1981, pp. 127-134. Each of these approaches requires the carry bits generated during the division to be propagated along the entire word length.

While it was possible to fabricate recursive division circuits which were relatively fast, parallel rather than serial/parallel techniques were employed. For example, while the Hewlett-Packard ISSCC 1986 divider chip could perform a 64-bit division in 1.6 microseconds, the chip contained approximately 160,000 transistors. Since the manufacturing cost of an integrated circuit is generally related to the space on a substrate material which the circuit occupies, the cost of implementing such recursive division circuits was high in relative terms. In addition, because the space required for an integrated circuit is often inversely related to the production yield during fabrication, the yield of these recursive division circuits was generally low in relative terms.

SUMMARY OF THE INVENTION

According to the preferred embodiment of the present invention, a method and apparatus for performing division is disclosed which calculates a quotient from a dividend and a divisor by recursive subtraction operations without using carry propagation for each subtraction operation. The apparatus comprises a circuit for generating a plurality of quotient digits from the divisor and the dividend. The apparatus also comprises a circuit for generating the quotient from the quotient digits.

BRIEF DESCRIPTION OF THE DRAWINGS

Various advantages of the present invention will become apparent to one skilled in the art upon reading the following specification and by reference to the following drawings in which:

FIGS. 3 and 4 are schematic diagrams of the divisor register shown in FIG. 2;

FIG. 5 is a schematic diagram of the partial sum register shown in FIG. 2;

FIGS. 6, 7, 8, 9 are schematic diagrams of a carry save adder shown in FIG. 2;

FIGS. 11, 12, 13, 14 are schematic diagrams of the one type of full adder forming the carry assimilation adder shown in FIG. 2;

FIGS. 15, 16, 17, 18, 19 are schematic diagrams of a second type of full adder forming the carry assimilation adder shown in FIG. 2;

FIGS. 20, 21, 22, 23 are schematic diagrams of the conversion registered data circuit shown in FIG. 2;

FIG. 26 is a schematic diagram of one of the two types of conversion registers shown in FIG. 2.

DESCRIPTION OF THE PREFERRED EMBODIMENTS

Figure 1:
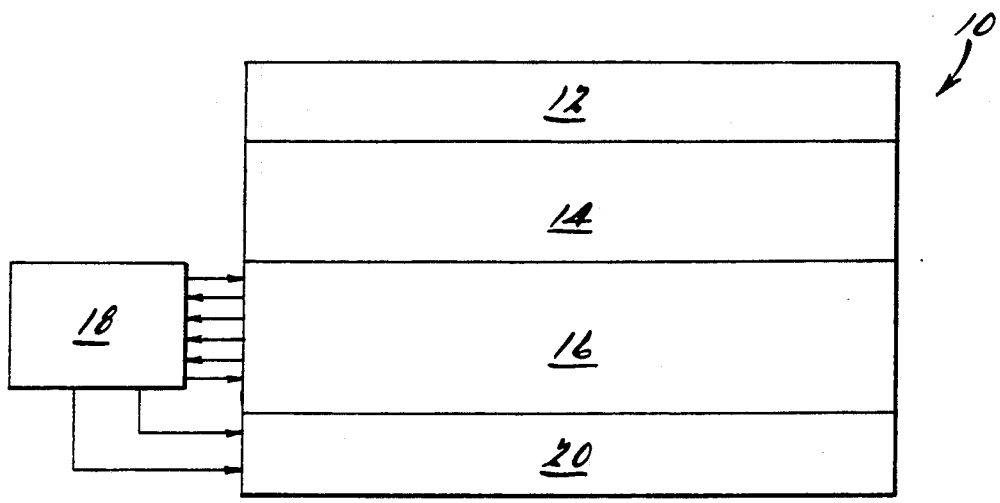
FIG. 1 is a block diagram of the apparatus for performing division according to the teachings of the preferred embodiment of the present invention.

Referring to FIG. 1, an apparatus 10 for performing division is shown. The apparatus includes a normalizer 12 which receives a divisor x and determines which bit of the divisor x is the most significant bit. The location of the most significant bit of the divisor x is determined by the normalizer 12 so that the circuits described below will operate on a divisor which has a value between $\frac{1}{2}$ and 1 and a dividend y having a value between $\frac{1}{4}$ and $\frac{1}{2}$. The position of the most significant bit of the divisor x is then delivered to a shifter 14, which shifts the divisor x so that the most significant bit is the first bit in the divisor x. The shifter 14 also shifts the dividend y by the same number of bits as the divisor x was shifted. While the normalizer 12 may be used as described above, it is to be understood that the normalizer 12 may be eliminated if the dividend y and the divisor x are provided to the shifter 14 in a normalized form. For illustrative purposes only, it will be assumed that the first bit of the divisor x is the most significant bit.

The apparatus 10 generates a quotient Q from a sign bit plus 31 quotient digits $q_n$ which are obtained from successive subtraction of partial remainders $z_n$ in a manner described below. To perform these successive subtractions, a division recursion circuit 16 is provided. The division recursion circuit 16 is used to successively multiply the divisor x by a quotient digit $q_n$ and subtract this result from the partial remainders $z_n$. The division recursion circuit 16 then shifts the result to the left by one bit.

To provide means for calculating the quotient digits $q_n$, a quotient selection circuit 18 is provided. The quotient selection circuit 18 is used to calculate the quotient digit $q_n$ and express the quotient digit $q_n$ as a quotient magnitude bit $Q_m$ and a quotient sign bit $Q_s$. To provide means for representing the quotient digit $q_n$ in two's complement notation, a quotient conversion circuit 20 is provided. The quotient conversion circuit 20 uses the individual quotient digits $q_n$ calculated by the quotient selection circuit 18 to generate the quotient Q. The division recursion circuit 16, the quotient selection circuit 18, and the quotient conversion circuit 20 permit the apparatus 10 to perform division according to the following steps:

1. Initialize $z(0) \leftarrow y$; $q_o \leftarrow 0$
2. Calculate the partial remainders by reiteration of the following two steps:

$$q_{j+1} \leftarrow \text{SEL}(2z(j)) \qquad 2.1$$

$$z_{j+1} \leftarrow 2z(j) - q_{j+1} x_j \qquad 2.2$$

3. Calculate the digit-vector Q using the following equations where the quotient $Q = A[M]$:

$$A[1] = \begin{cases} +\tfrac{1}{2}(0.1) \text{ if } q_1 = +1 \\ -\tfrac{1}{2}(1.1) \text{ if } q_1 = -1 \end{cases}$$

$$B[1] = \begin{cases} +0(0.0) \text{ if } q_1 = +1 \\ -1(1.0) \text{ if } q_1 = -1 \end{cases}$$

$$A[k+1] = \begin{cases} A[k] + 2^{-(k+1)} \text{ if } q_{k+1} = 1 \\ A[k] \text{ if } q_{k+1} = 0 \\ B[k] + 2^{-(k+1)} \text{ if } q_{k+1} = -1 \end{cases}$$

where:
 x is the divisor.
 y is the dividend.
 $q_j$ is the $j^{th}$ quotient digit.
 z(j) is the $j^{th}$ partial remainder internally represented as a pair of bit-vectors (i.e., a partial sum bit $PS_j$ and a partial carry bit $PC_j$).
 SEL is a quotient digit selection function given by the equations of the SRT division discussed by J. E. Robertson in "Theory of Computer Arithmetic...," U. of Ill., Digital Computer Lab, file No. 319, 1960.

$$q_{j+1} = Q_m = \begin{cases} 0 \text{ if } -\tfrac{1}{2} \leq 2z(j) < \tfrac{1}{2} \\ \text{sign } x \text{ 1 otherwise} \end{cases}$$

$$\text{sign} = Q_s = \begin{cases} + \text{ if sign } z(j) = \text{sign } x_j \\ - \text{ if sign } z(j) \neq \text{sign } x_j \end{cases}$$

2z(j) is the $j^{th}$ partial remainder shifted to the left by one bit and truncated to 4 bits including sign.

Figure 2B:
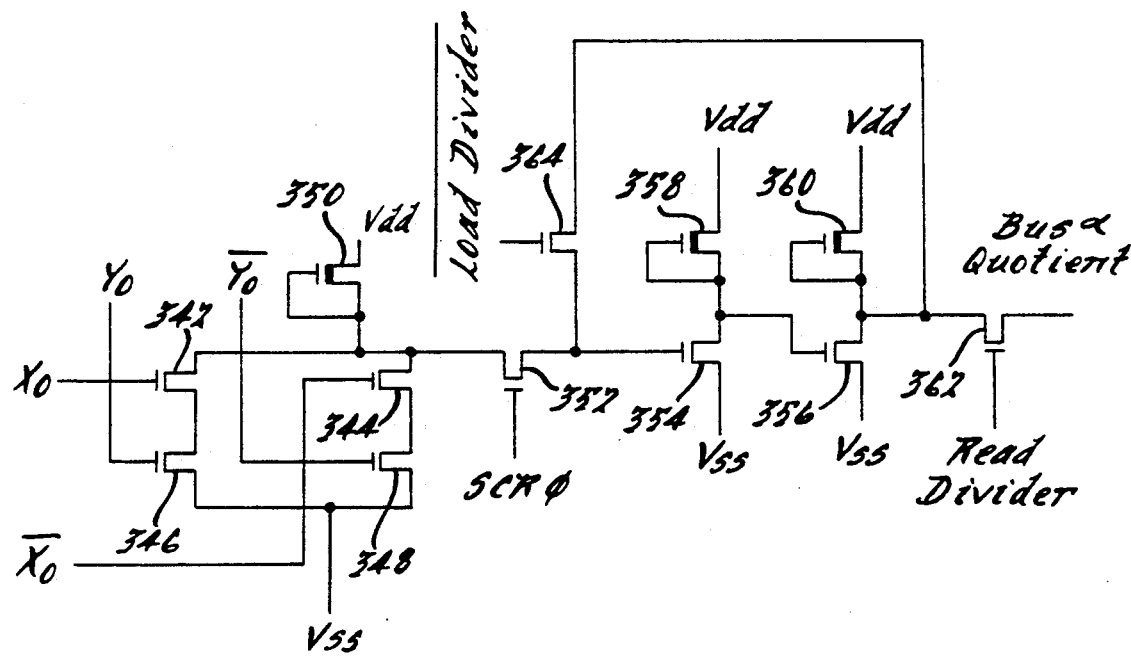
FIG. 2 illustrates the arrangement of the division recursion, quotient selection, and quotient conversion circuits of the apparatus for performing division illustrated in FIG. 1.
Figure 2:
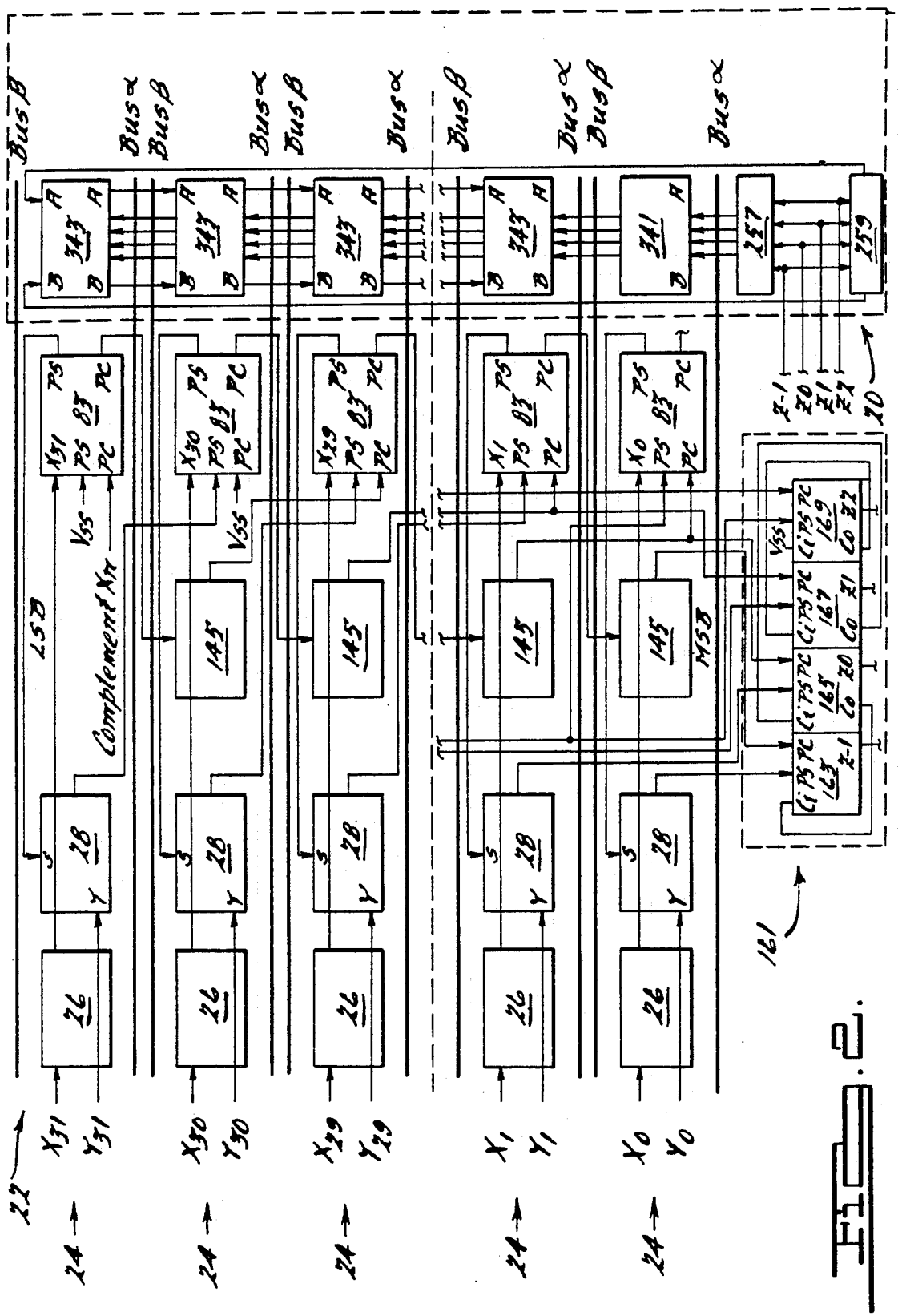

By using the foregoing method, the present invention is able to perform divisions without using carry propagation during each subtraction step. By not using carry propagation during each subtraction step, the speed of the division is relatively high (approximately 2.1 μsec for a 32-bit division operation) while the number of components required to implement the circuit is relatively small. The components of the division recursion circuit 16, the quotient selection circuit 18, and the quotient conversion circuit 20 may comprise an arithmetic bit slice configuration 22 having a plurality of bit slices 24. As shown in FIG. 2, each bit slice 24 of the bit slice configuration 22 includes Bus $\alpha$ and Bus $\beta$ which permit the components of the bit slice 24 to electrically communicate. The Bus $\alpha$ is used for delivering the bits of the divisor x to the various components of the bit slice 24, while the Bus $\beta$ is used for delivering the bits of the dividend y to the components of the bit slice 24. The timing of the electrical interaction between the components in each bit slice 24 is controlled by two arithmetic clocks $\phi_1$ and $\phi_2$ which are 180° out of phase. While the present invention may be implemented using a bit slice configuration 22, it is to be understood that other suitable implementations are possible.

To store each bit of the divisor x and the dividend y, the division recursion circuit 16 comprises a plurality of divisor registers 26 and partial sum registers 28. Each of the divisor registers 26 are used to store the digit of the divisor x which is delivered to a particular bit slice 24 in the bit slice configuration 22, while partial sum registers 28 are used to store the partial sum bits $PS_n$ which are generated by the carry shift adders described below. To initialize the partial sum registers 28, each of the partial sum registers 28 also receives one bit of the dividend y which is delivered to the corresponding bit slice 24 in the bit slice configuration 22 upon delivery of a LOAD DIVIDER control signal.

Figure 3:
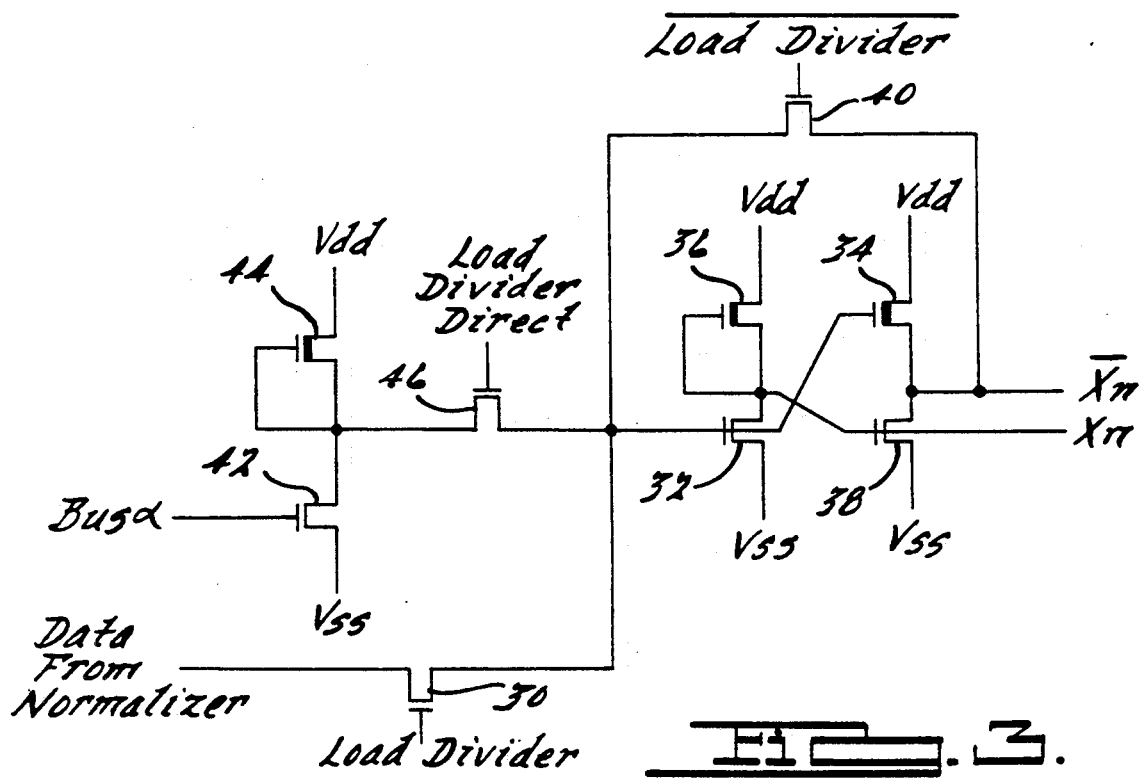
Figure 9:
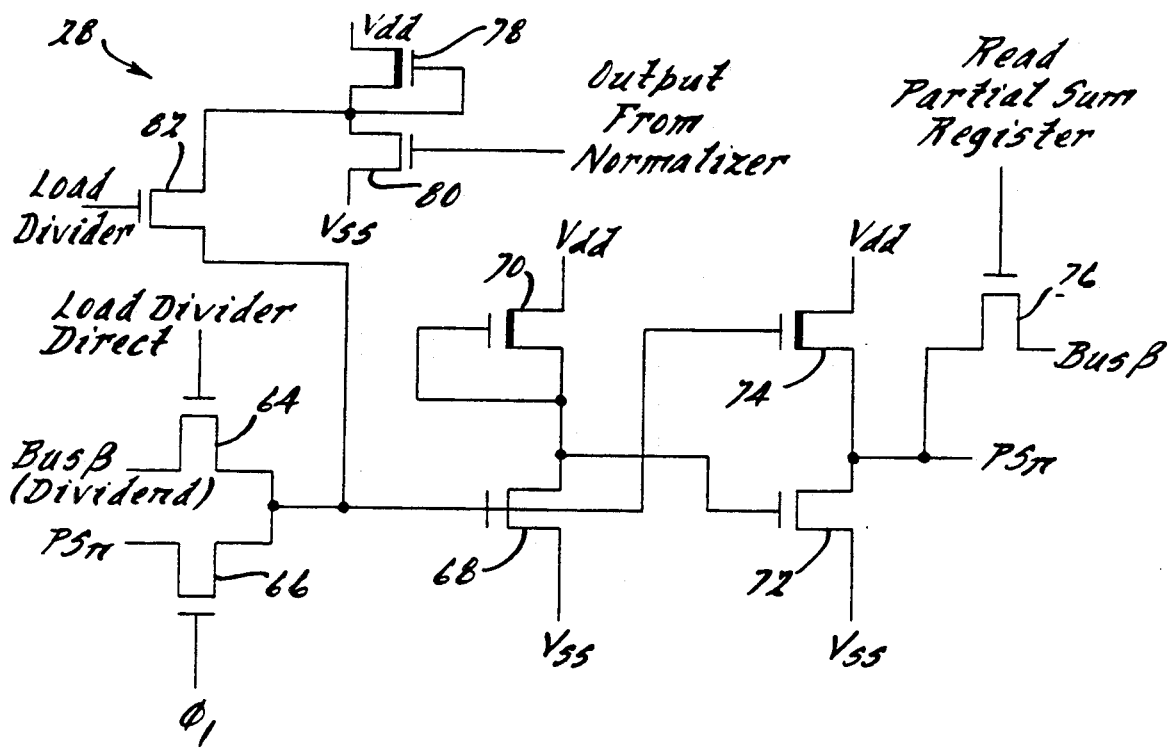

To implement the divisor registers 26, the circuit shown in FIGS. 3 and 4 may be used. The divisor digit $x_n$ of the output of the normalizer 12 is received through a pass transistor 30 to the gates of the transistors 32 and 34 upon delivery of a LOAD DIVIDER signal. The drain of the transistor 32 is connected to the gates of the transistors 36 and 38. Further, the drain of the transistor 38 is connected to the gate of the transistor 32 through the transistor 40. After the output from the normalizer 12 is loaded into the divisor register 26, a $\overline{\text{LOAD DIVIDER}}$ control signal is delivered to the gate of the transistor 40 which permits storage of the divisor digit complement $\overline{x_n}$ which is generated at the drain of the transistor 38. In addition, the divisor digit $x_n$ generated at the source of the transistor 36 is also stored when the $\overline{\text{LOAD DIVIDER}}$ control signal is delivered to the gate of the transistor 40. To allow the signals propagating in the Bus $\alpha$ to represent the output from the divisor register 26 during testing, the transistors 42–46 are provided. When a low signal is delivered by the Bus $\alpha$ to the gate of the transistor 42, the transistor 42 comes out of conduction thereby increasing the potential at the source of the transistor 44. Upon delivery of a LOAD DIVIDER DIRECT control signal to the gate of the transistor 46, the output from the source of the transistor 44 is delivered to the gates of the transistors 32 and 34. When a sufficiently high voltage is delivered to the gate of the transistor 42 by Bus $\alpha$, the voltage at the source of the transistor 44 declines thereby bringing the transistors 32 and 34 out of conduction. A high signal therefore appears at the drain of the transistor 32, while a low signal appears at the drain of the transistor 38.

To permit the output of the divisor register 26 to equal the divisor digit $x_n$, the divisor digit complement $\overline{x_n}$, or zero upon delivery of an appropriate control signal, the transistors 48–62 are provided as shown in FIG. 4. Upon delivery of a USE X control signal to the gate of the transistor 48, the voltage at the source of the transistor 50 becomes dependent upon the voltage delivered to the gate of the transistor 52 which represents the divisor digit complement $\overline{x_n}$. When the divisor digit complement $\overline{x_n}$ is high, the voltage at the source of the transistor 50 is low. When the divisor digit complement $\overline{x_n}$ is low, the voltage at the source of the transistor 50 is high. Similarly, when a $\overline{USE\ X}$ control signal is delivered to the gate of the transistor 54, the voltage at the source of the transistor 50 becomes dependent upon the voltage of the divisor digit $x_n$ delivered to the gate of the transistor 56. When the voltage of the signal representing the divisor digit $x_n$ is high, the transistor 56 conducts thereby causing the voltage at the source of the transistor 50 to decline. When the voltage of the signal representing the divisor digit $x_n$ is low, the voltage at the source of the transistor 50 is high. To permit the output of the divisor register 26 to equal a zero voltage regardless of the value of the divisor digit $x_n$, a transistor 58 is provided. Upon delivery of a USE ZERO control signal to the gate of the transistor 58, the output of the divisor register 26 is connected to the $V_{ss}$ supply voltage. To generate the complement of the output of the source of the transistor 50, the transistors 60 and 62 are provided. The gate of the transistor 60 is connected to the source of the transistor 50, while the drain of the transistor 60 is connected to the gate and the source of the transistor 62. When a high voltage is delivered to the gate of the transistor 60, the voltage at the source of the transistor 62 declines thereby producing a low voltage at the complement output of the divisor register 26. When a low voltage is delivered to the gate of the transistor 60, the voltage of the source of the transistor 60 increases thereby producing a high voltage at the complement output of the divisor register 26.

To implement the partial sum registers 28, the circuit shown in FIG. 5 may be used. Each partial sum register 28 includes a transistor 64 which receives the signal propagating in the Bus $\beta$ and a transistor 66 which receives a partial sum bit $PS_n$ from a carry save adder described below. Upon delivery of LOAD DIVIDER DIRECT control signal to the gate of the transistor 64, the dividend digit $y_n$ is delivered to the gate of the transistor 68. Similarly, the delivery of a $\phi_1$ clock signal to the gate of the transistor 66 causes the partial sum bit $PS_n$ to be delivered to the gate of the transistor 68. When a sufficient voltage is delivered by either the transistors 64 or 66 to the gate of the transistor 68, the voltage at the drain of a depletion mode transistor 70 declines causing a reduction in voltage delivered to the gate of the transistor 72. When the voltage delivered to the gate of the transistor 72 declines in this manner, the voltage at the source of a depletion mode transistor 74 representing the partial sum bit $PS_n$ increases. The voltage at the source of the transistor 74 is delivered to a carry save adder described below. To selectively deliver the partial sum bit $PS_n$ to the Bus $\beta$, a transistor 76 is provided. Upon delivery of a READ PARTIAL SUM REGISTER control signal to the gate of the transistor 76, the partial sum bit $PS_n$ is delivered to the Bus $\beta$ through the transistor 76.

To initialize the partial sum registers 28, the transistors 78–82 are provided. The source of the transistor 78 is connected to the drain of the transistor 80 as well as to the gate of the transistor 78. Upon delivery of a high voltage representing the dividend digit $y_n$ from the normalizer 12 to the gate of the transistor 80, the transistor 80 begins to conduct, thereby causing the output delivered from the source of the transistor 78 to be low. Upon delivery of a LOAD DIVIDER control signal to the gate of the transistor 82, the output from the source of the transistor 78 is delivered to the gate of the transistor 68. Because a low voltage delivered to the gate of the transistor 68 brings the transistor 68 out of conduction, a low voltage is delivered to the output of partial sum register 28 representing the partial sum bit $PS_n$. Similarly, when a low voltage is delivered to the gate of the transistor 80, a high voltage is generated at the output of the partial sum register 28 representing the partial sum bit $PS_n$.

To add the outputs from the divisor registers 26, the partial sum registers 28 and the partial carry registers described below, a plurality of carry save adders 83 are provided. Each of the carry save adders 83 receive a divisor digit $x_n$ from a divisor register 26, the partial sum bit $PS_n$ from a partial sum register 28, and a partial carry bit $PC_n$ from a partial carry register described below. Each of the carry save adders 83 add their inputs to generate a partial sum bit $PS_n$ and a partial carry bit $PC_n$.

To implement the carry save adders 83, the circuit shown in FIGS. 6–9 may be used. To amplify the partial sum bit $PS_n$ upon receipt by one of the carry save adders 83, the transistors 84–92 are provided as shown in FIG. 6. Upon delivery of a clock signal $\phi_2$ to the gate of the transistor 84, the partial sum bit $PS_n$ is delivered to the gates of the transistors 86 and 88. Because the drain of the transistor 86 is connected to the gate of the transistor 90, a partial sum bit $PS_n$ represented by a low voltage will cause the transistor 90 to conduct. Because the transistor 90 is brought into conduction, the voltage at the drain of the transistor 90 represented as the $S_i$ signal is low, and the voltage at the source of the transistor 92 represented as the $S_i$ signal is high. Similarly, if the voltage representing the partial sum bit $PS_n$ is high, the transistors 86 and 88 conduct causing a high voltage to be delivered by the source of the transistor 88 representing the $S_i$ signal. The transistors 84–92 thereby serve to amplify the partial sum bit $PS_n$ prior to delivery of the remaining components of the carry save adder 83.

To amplify the signal representing the partial carry bit $PC_n$, the carry save adder 83 further comprises the transistors 94–100 as shown in FIG. 8. The gate of the transistor 94 receives the partial carry bit $PC_n$ which is also delivered to the gate of the transistor 96. Because the gate of the transistor 98 is connected to the source of the transistor 100 as well as to the drain of the transistor 94, the delivery of a high voltage signal to the gate of the transistor 94 causes the voltage at the source of the transistor 100, which is delivered to the gate of the transistor 98, to decline. Because the voltage delivered to the gate of the transistor 98 declines, the voltage at the drain of the transistor 98 becomes high. To provide an exclusive OR gate responsive to the partial sum bit $PS_n$ and the divisor digit $x_n$, the carry save adder 83 further comprises the transistors 102–112. The gates of the transistors 102 and 104 receive the divisor digit $x_n$, while the gates of the transistors 106 and 108 receive the divisor digit complement $\overline{x_n}$. The drains of the transistors 102 and 108 receive the output from the source of the transistor 96 upon delivery of a $\phi_2$ clock signal to the gate of the transistor 110. Similarly, the drains of the transistors 104 and 106 receive the output from the source of the transistor 100 upon delivery of a $\phi_2$ clock signal to the gate of the transistor 112. The output from the sources of the transistors 102 and 106 indicated as the $I_s$ signal therefore represents the result of an exclusive OR operation on the input signal to the gates of the transistors 102 and 104 and the output from the source of the transistor 96. Similarly, the output from the source of the transistors 104 and 108 represents an exclusive OR complement operation on the input to the gates of the transistors 102 and 104 as well as the output from the source of the transistor 96.

To generate the partial sum bit $PS_n$, the source of the transistor 104 is connected to the gate of the transistor 114, while the source of the transistor 92 is connected to the gate of the transistor 116. Similarly, the source of the transistor 102 is connected to the gate of the transistor 118, while the source of the transistor 88 is connected to the gate of the transistor 120. If the voltages delivered to the gates of the transistors 114 and 116 are both high, or the voltages delivered to the gates of the transistors 118 and 120 are both high, the voltage at the source of the transistor 122 declines which is then delivered to the gate of the transistor 124 through the transistor 126 upon delivery of a $\phi_2$ clock signal to the gate of the transistor 126. Accordingly, the output from the drain of the transistor 124 representing the partial sum bit $PS_n$ will be a high voltage when either the voltage at the inputs of the gates of the transistors 114 and 116 are both high, or when the inputs to the gates of the transistors 118 and 120 are both high.

To generate a partial carry bit $PC_{n-1}$ which is delivered to the partial carry register described below used in processing the next most significant bit, the transistors 130–144 are provided. The gate of the transistor 130 receives the output from the source of the transistors 102 and 106, while the gate of the transistor 132 receives the divisor digit $x_n$. Similarly, the gate of the transistor 134 receives the output from the sources of the transistors 104 and 108, while the gate of the transistor 136 receives the output of the source of the transistor 88. When the high voltage is delivered to the gates of both the transistors 130 and 132, or to the gates of both the transistors 134 and 136, the voltage at the source of the transistor 138 declines. The low voltage at the source of the transistor 138 is delivered to the gate of the transistor 140 through the transistor 142 upon delivery of a $\phi_2$ clock signal to the gate of the transistor 142. When a low voltage is applied to the gate of the transistor 140, the voltage at the drain of the transistor 140 increases thereby generating a high signal indicative of the partial carry bit $PC_{n-1}$.

To store the partial carry bits $PC_n$ generated by the carry save adders 83, the division recursion circuit 16 further includes a plurality of partial carry registers 145. The partial carry registers 145 receive the partial carry bit $PC_n$ from one carry save adder 83, and deliver the partial carry bit $PC_n$ to another carry save adder 83 in a different bit slice 24 of the bit slice configuration 22.

Figure 10:
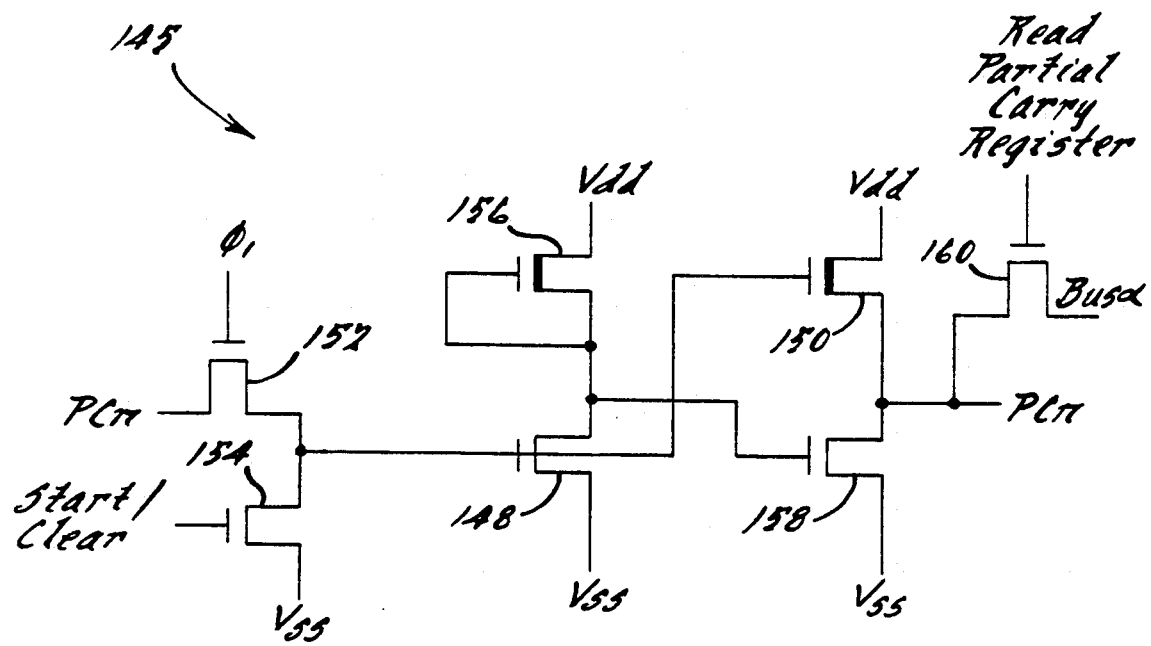
FIG. 10 is a schematic diagram of the partial carry register shown in FIG. 2.

To implement the partial carry register 145, the circuit shown in FIG. 10 may be used. The partial carry bit $PC_n$ is delivered from the carry save adder 83 to the gates of the transistors 148 and 150 through the transistor 152 upon receipt of a $\phi_1$ clock signal by the gate of the transistor 152. During an initial clearing operation, however, gates of the transistors 148 and 150 are connected to $V_{ss}$ supply voltage upon delivery of a START/CLEAR control signal to the gate of the transistor 154. The drain of the transistor 148 is connected to the source and the gate of the depletion mode transistor 156. Since the drain of the transistor 158 is connected to the source of the transistor 150, the output at the source of the transistor 150 represents the partial carry bit $PC_n$. To permit the output of the partial carry register 145 to be delivered to the Bus $\alpha$, the transistor 160 is provided. The drain of the transistor 160 is connected to the source of the transistor 150, while the source of the transistor 160 is connected to the Bus $\alpha$. Upon delivery of a READ PARTIAL CARRY REGISTER control signal to the gate of the transistor 160, the output from the source of the transistor 150 representing the partial carry bit $PC_n$ is delivered to the Bus $\alpha$.

To provide means for determining the quotient digits $q_n$, the quotient selection circuit 18 comprises a carry assimilation or ripple adder 161 comprising four full adders 163, 165, 167 and 169 as shown in FIG. 2. Each of the full adders 163, 165, 167 and 169 receives one partial sum bit $PS_n$ from one of the four partial sum registers 28 associated with one of the four most significant bits of the dividend y. For example, the carry full adder 163 receives the output of the partial sum register 28 associated with the most significant bit of the dividend y, while the full adder 165 receives the output from the register 28 associated with the next most significant bit of the dividend y. In addition, each of the full adders 163, 165, 167 and 169 receives a partial carry bit $PC_n$ from one of the partial carry registers 145 which is in the same bit slice 24 as the partial sum register 28 which delivered the partial sum bit $PS_n$ to that particular full adder. The carry output $C_o$ generated by the addition of the partial carry bit $PC_n$ and the partial sum digit $PS_n$ in the full adder 169 is delivered to the carry input $C_i$ of the full adder 167. Similarly, the carry output $C_o$ of the full adder 167 is delivered to the carry input $C_i$ of the full adder 165, and the carry output $C_o$ from the full adder 165 is delivered to the carry input $C_i$ of the full adder 163. The full adders 163, 165, 167 and 169 generate outputs $z_{-1}$, $z_0$, $z_1$, and $z_2$ which represent the truncated partial remainder including a sign bit which is then delivered to the quotient conversion circuit 20.

To implement the full adder 169, the circuit shown in FIGS. 11–14 may be used. The full adder 169 includes the transistors 162 and 164 which are used to generate a partial sum bit complement $\overline{PS_n}$ as shown in FIG. 11. The gate of the transistor 162 receives the partial sum bit $PS_n$ from a partial sum register 28. Because the drain of the transistor 162 is connected to the source and gate of the transistor 164, a high voltage delivered to the gate of the transistor 162 produces a low voltage at the source of the transistor 164. The output at the source of the transistor 164 can therefore represent the complement of the input to the gate of the transistor 162. Similarly, the full adder 169 further comprises the transistors 166 and 168 which are used to generate a partial carry bit complement $\overline{PC_n}$ as shown in FIG. 12. The gate of the transistor 166 receives a partial carry bit $PC_n$ from one of the partial carry registers 145. Because the drain of the transistor 166, the compliment of the input to the gate of the transistor 168 appears at the source of the transistor 168.

To generate the partial remainder bit $z_2$, the transistors 170–186 are provided as shown in FIG. 13. The gate of the transistor 170 receives the partial carry bit complement $\overline{PC_n}$, while the gate of the transistor 172 receives a partial carry bit $PC_n$. Similarly, the gate of the transistor 174 receives the partial sum bit $PS_n$, while the gate of the transistor 176 receives the partial sum complement bit $\overline{PS_n}$. Because the drains of the transistors 170 and 172 are connected to the source of the transistor 178, the voltage at the source of the transistor 178 will be low if either the voltages delivered to the gates of both the transistors 170 and 174 are low, or the voltages delivered to the gates of both the transistors 172 and 176 are low. The output from the source of the transistor 178 is delivered to the gate of the transistor 180, the drain of which is connected to the source and the gate of the transistor 182. Accordingly, the voltage at the source of the transistor 182 representing the partial remainder bit $z_2$ is inversely related to the voltage delivered to the gate of the transistor 180 by the source of the transistor 178. The source of the transistor 182 is connected to the gate of the transistor 184, the drain of which is connected to the source and the gate of the transistor 186. Because the voltage appearing at the source of the transistor 186 is inversely related to the voltage appearing at the gate of the transistor 184, the output at the source of the transistor 186 may be used to represent the partial remainder bit complement $\bar{z}_2$.

To generate the carry output $C_o$ associated with the addition of the partial sum bit $PS_n$ with the partial carry bit $PC_n$, the transistors 188–192 are provided as shown in FIG. 14. The gate of the transistor 188 receives the partial sum bit complement $\overline{PS}_n$, while the gate of the transistor 190 receives the partial carry bit complement $\overline{PC}_n$. When either of the voltages applied to the gates of the transistor 188 and 190 is low, the output from the source of the transistor 192 is high which represents the carry output $C_o$ of the full adder 169.

To implement the full adders 163, 165 and 167, the circuits shown in FIGS. 15–19 may be used. To generate the partial sum bit complement $\overline{PS}_n$ from the partial sum bit $PS_n$, the transistors 192 and 194 are provided as shown in FIG. 15. When a high voltage representing a partial sum bit $PS_n$ is delivered to the gate of the transistor 192, the transistor 192 begins to conduct. Since the drain of the transistor 192 is connected to the source and the gate of the transistor 194, the voltage at the source of the transistor 194 declines. When a low voltage representing a partial sum bit $PS_n$ is delivered to the gate of the transistor 192, the transistor 192 comes out of conduction thereby generating a high voltage at the source of the transistor 194. Accordingly, the voltage at the source of the transistor 194 may be used to represent the partial sum bit complement $\overline{PS}_n$. To generate a partial carry bit complement $\overline{PC}_n$, the transistors 196 and 198 are provided as shown in FIG. 16. The voltage representing the partial carry bit $PC_n$ is delivered to the gate of the transistor 196. Because the drain of the transistor 196 is connected to the source and the gate of the transistor 198, a partial carry bit $PC_n$ represented by low voltage delivered to the gate of the transistor 196 produces a high voltage at the source of the transistor 198. Similarly, a partial carry bit $PC_n$ represented by a high voltage delivered to the gate of the transistor 196 produces a low voltage at the source of the transistor 198. Accordingly, the voltage at the source of the transistor 198 may be used to represent the partial carry bit complement $\overline{PC}_n$.

As shown in FIG. 17, the output from the source of the transistor 194 representing the partial sum compliment bit $\overline{PS}_n$ is delivered to the gate of the transistor 206, while the voltage at the gate of the transistor 196 representing the partial carry bit $PC_n$ is delivered to the gate of the transistor 200. Similarly, the gate of the transistor 204 receives the partial sum bit $PS_n$, while the gate of the transistor 202 receives the partial carry bit complement $\overline{PC}_n$. Because the drains of the transistors 200 and 202 are connected to the source of the transistor 208, when the value of the partial sum bit $PS_n$ and the partial carry complement bit $\overline{PC}_n$ are both high, the output from the source of the transistor 208 is low. In addition, when the voltages delivered to the gates of the transistors 200 and 206 are both high, the voltage at the source of the transistor 208 is also low. The output from the source of the transistor 208 is delivered to the gate of the transistor 210. The drain of the transistor 210 is connected to the gate and the source of the transistor 212. The output from the source of the transistor 212, which is represented as an A signal, is delivered to the gate of the transistor 214. Because the drain of the transistor 214 is connected to the source and the gate of the transistor 216, a high voltage appearing at the gate of the transistor 210 produces a high voltage at the source of the transistor 216 which is represented as the $\bar{A}$ signal. Similarly, a low voltage at the gate of the transistor 210 produces a low voltage at the source of the transistor 216.

To generate the C signal for use in the full adders 163, 165 and 167, the transistors 218 and 220 are provided as shown in FIG. 19. The gate of the transistor 218 receives the partial sum bit complement $\overline{PS}_n$, while the gate of the transistor 220 receives the partial carry bit complement $\overline{PC}_n$. The drains of the transistors 218 and 220 are connected to the source and the gate of the transistor 222. When the voltage applied to either of the gates of the transistors 218 and 220 is high, the voltage at the source of the transistor 222 declines. Because the source of the transistor 222 is connected to the gate of the transistor 224, a low voltage at the source of the transistor 222 causes the transistor 224 to come out of conduction. To selectively connect the source of the transistor 224 to the $V_{ss}$ supply voltage, the transistor 226 is provided. The gate of the transistor 226 is connected to the source and the gate of the transistor 228, as well as to the drains of the transistors 230 and 232. Upon delivery of a high voltage representing the partial sum bit $PS_n$ to the gate of the transistor 230, or a high voltage representing the partial carry bit $PC_n$ to the gate of the transistor 232, the voltage at the source of the transistor 228 declines thereby bringing the transistor 226 out of conduction. The source of the transistor 224 as well as the drain of the transistor 226 are connected to the gate of the transistor 234 through a pass transistor 236 upon delivery of an A signal to the gate of the transistor 236. The gate of the transistor 234 also receives a carry input $C_i$ signal from another of the full adders 163, 165 and 167. The gate of the transistor 234 is connected to the gate of the transistor 238. In addition, the drain of the transistor 234 is connected to the source and gate of the transistor 240, as well as to the gate of the transistor 242. The output from the source of the transistor 238 is represented as the C signal, and the output of the source of the transistor 243 is represented as the $\bar{C}$ signal. Both the C signal and the $\bar{C}$ signal are used by the full adders 163, 165 and 167 in the manner described below. In addition, the transistors 218–226 serve to produce a high carry output $C_o$ signal when the partial sum bit $PS_n$ and partial carry bit $PC_n$ are both high, and produce a low carry output signal when the carry input $C_i$ signal is high and both the partial sum bit $PS_n$ and the partial carry bit PC are low.

To generate the partial remainder bits $z_n$ from the A, $\bar{A}$, C and $\bar{C}$ signals, the transistors 244–256 are provided. The gate of the transistor 244 receives the A signal from the source of the transistor 212, while the gate of the transistor 246 receives the $\bar{A}$ signal from the source of the transistor 216. Similarly, the gate of the transistor 248 receives the C signal from the source of the transistor 238, while the gate of the transistor 250 receives the $\overline{C}$ signal from the source of the transistor 243. Because the drains of the transistors 244 and 246 are connected to the source of the transistor 252, the output from the source of the transistor 252 will be low when both the input to the gates of the transistors 244 and 250 are both high, or when the inputs to the gates of the transistors 246 and 248 are both high. The voltage at the source of the transistor 252 is then used to represent the partial remainder bit complement $z_n$. To generate the partial remainder bit $z_n$, the transistors 254 and 256 are provided. The drain of the transistor 254 is connected to both the gate and the source of the transistor 256. Because the source of the transistor 252 is connected to the gate of the transistor 254, the voltage at the source of the transistor 256 will represent the partial remainder bit $z_n$.

To permit the quotient conversion circuit 20 to convert the quotient digits $q_n$ into a two's complement binary notation, the quotient conversion circuit 20 includes a conversion register steering circuit 257 and a conversion register data circuit 259 as shown in FIG. 2. The conversion register data circuit 259 receives the partial remainders $z_{-1}$, $z_0$, $z_1$, and $z_2$ from the full adders 163, 165, 167 and 169 and generates a quotient magnitude bit $Q_m$ and a quotient sign bit $Q_s$ in response thereto. The conversion register steering circuit 257 receives the output from the conversion register data circuit 259 and generates control signals which are used in channelling the outputs of the conversion registers described below.

To implement the conversion register data circuit 259, the circuit shown in FIGS. 20-23 may be used. The partial remainders $z_0$, $z_1$ and $z_2$ from the full adders 165, 167 and 169 are delivered to the gates of the transistors 262, 264 and 266 respectively, as shown in FIG. 20. When any of the partial remainders $z_0$, $z_1$ and $z_2$ are represented by a high voltage, the voltage at the source of the depletion mode transistor 268 declines thereby causing the transistor 270 to come out of conduction. Similarly, if any of the partial remainder bits complement $z_0$, $z_1$, and $z_2$ delivered to the gates of the transistors 274-278 are represented by a high voltage, the output at the source of the depletion mode transistor 280 delivered to the gate of the transistor 282 is low. To generate a quotient magnitude bit $Q_m$ and a quotient magnitude bit complement $Q_m$ which are used in conjunction with the conversion register steering circuit described below, the transistors 284-296 are provided. When the output from either of the sources of the transistors 280 and 268 are low, the transistors 282 and 270 come out of conduction thereby producing a high voltage at the source of the depletion mode transistor 284. The high voltage at the source of the transistor 284 is then delivered to the gate of the transistor 286 which causes a low voltage to appear at the source of the transistor 288. The voltage at the source of the transistor 284 is delivered to the gates of the transistors 290 and 292. In addition, the voltage at the source of the transistor 294 is delivered to the gate of the transistor 288 as well as the gate of the transistor 296. By connecting the transistors 284-296 in this manner, the output at the source of the transistor 292 will represent the quotient magnitude bit complement $Q_m$ which is inversely related to the output of the source of the transistor 288 which represents the quotient magnitude bit $Q_m$. In addition, the output from the source of the transistor 288 corresponds to a USE ZERO control signal which is used in conjunction with the divisor register 26 described above. The quotient magnitude bit complement $Q_m$ is delivered to the A input of the conversion registers described below which is associated with the least significant non-sign bit, while the quotient magnitude bit complement $Q_m$ is delivered to the B input of the same conversion register.

To process the sign information from the partial remainders $z_{-1}$, $z_0$, $z_1$, and $z_2$, the conversion register data circuit 259 further comprise the transistors 298-304 as shown in FIGS. 21 and 22. The transistor 298 generates a quotient sign bit $Q_s$ when the partial remainder bit $z_{-1}$ is high and the divisor digit complement $x_n$ is also high. In addition, the quotient sign bit $Q_s$ is generated by the transistor 300 when partial remainder bit complement $z_{-1}$ is high and the voltage representing the divisor digit $x_n$ is high. To generate the quotient sign bit complement $Q_s$, the transistors 302 and 304 are provided. The transistor 304 generates a high quotient sign bit complement $Q_s$ when a high voltage representing a partial remainder bit $z_{-1}$ is delivered to the transistor 302 and a high voltage signal divisor digit $x_n$ is applied to the gate of the transistor 302. In addition, a quotient sign bit complement $Q_s$ is also generated by the transistor 304 when the transistor 304 receives a partial remainder complement bit $z_{-1}$ having a high voltage and the gate of the transistor 304 receives a high voltage signal representing the divisor digit complement $x_n$.

Figure 24:
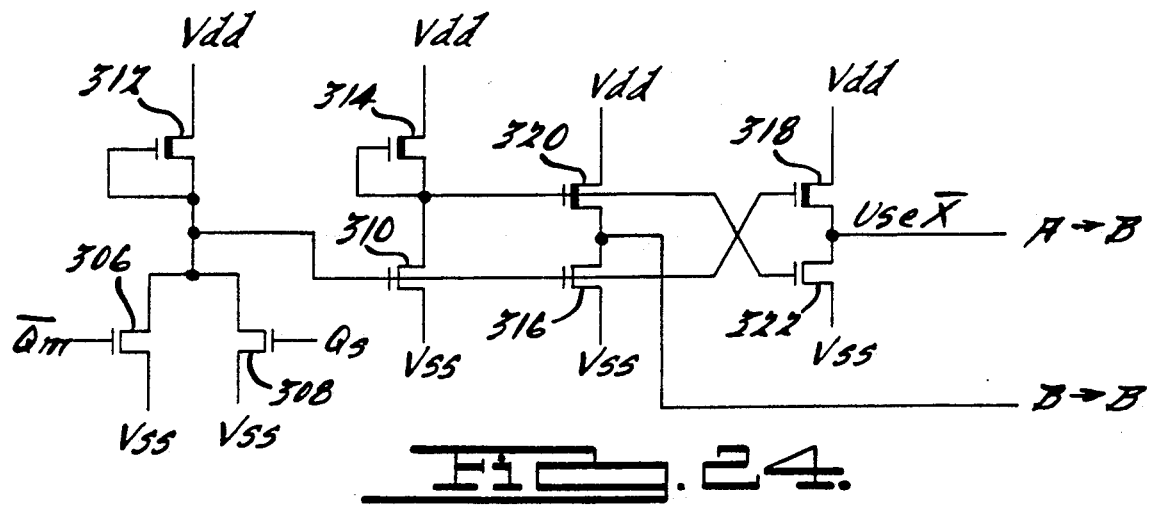
FIGS. 24, 25 are schematic diagrams of the conversion registered steering circuit shown in FIG. 2.

To implement the conversion register steering circuit 257, two transistors 306 and 308 are provided as shown in FIG. 24 which receive the quotient magnitude bit complement $Q_m$ and the quotient sign bit $Q_s$ from the conversion register data circuit 259. If either the quotient magnitude bit complement $Q_m$ or the quotient sign bit $Q_s$ are represented by a high voltage, the output delivered by the source of the transistor 312 causes the transistor 310 to go out of conduction thereby causing the voltage at the source of the transistor 314 to be high. Similarly, if neither the quotient magnitude bit complement $Q_m$ nor the quotient sign bit $Q_s$ is high, the output at the source of the transistor 314 is low. To amplify the signals from the sources of the transistors 312 and 314, the transistors 316-322 are provided. The gates of the transistors 316 and 318 receive the output from the source of the transistors 312, while the gates of the transistors 320 and 322 receive the output of the source of the transistor 314. Because the source of the transistor 318 is connected to the drain of the transistor 322, the output from the drain of the transistor 322 represents the compliment of the output from the source of the transistor 320. If either of the quotient magnitude bit complement $Q_m$ or the quotient sign bit $Q_s$ is high, the voltage at the source of the transistor 320 is high thereby indicating that the signals appearing at the B inputs of each of the conversion registers described below should be channeled to their B outputs. If neither the quotient magnitude bit complement $Q_m$ nor the quotient sign bit $Q_s$ is high, then the output from the source of the transistor 318 is high indicating that the signals appearing at the A inputs of the conversion register should be channeled to the B outputs. In addition, the output from source of the transistor 318 corresponds to a USE X control signal which is used for controlling the divisor register 26.

Figure 25:
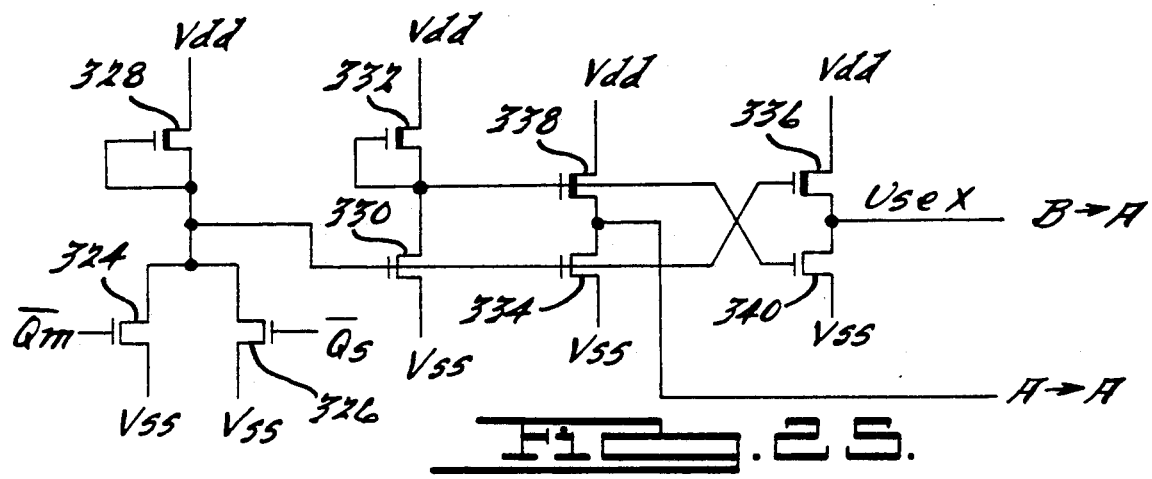

With respect to the portion of the conversion register steering circuit 257 shown in FIGS. 25 which controls the A outputs of the conversion registers described below, the quotient magnitude bit complement $Q_m$ is delivered to the gate of the transistor 324 while the quotient sign bit complement $Q_s$ is delivered to the gate of the transistor 326. If either of these bits is represented by a high voltage, the output of the source of the depletion mode transistor 328 becomes low thereby bringing the transistor 330 out of conduction and generating a high output at the source of the depletion mode transistor 332. To amplify the signals from the source of the transistors 332 and 328, the transistors 334–340 are provided which are arranged in an inverter pair. The high output at the source of the transistor 338 is used by the conversion registers to indicate that the signals delivered to the A inputs of the conversion registers should be channeled to the A outputs. If neither the quotient magnitude bit complement $Q_m$ nor the quotient sign bit complement $Q_s$ is represented by a high voltage, the output of the source of the depletion mode transistor 336 will be high indicating that the signals delivered to the B inputs of the conversion registers should be delivered to the A outputs.

To provide means for converting the quotient magnitude bit $Q_m$ and the quotient sign bit $Q_s$ into two's complement notation, the quotient conversion circuit 20 further comprises a plurality of conversion registers 341 and 343 as shown in FIG. 2. The conversion register 341 is associated with the bit slice 24 corresponding to the most significant digit of the divisor $x_o$ and the dividend $y_o$, while the conversion registers 343 are associated with the bit slices 24 which process the other bits. To implement the conversion register 341, the circuit shown in FIG. 26 may be used. The most significant bit of the divisor $x_o$ is delivered to the gate of the transistor 342 and the complement of the most significant division bit of the divisor $x_o$ is delivered to the gate of the transistor 344. In addition, the most significant bit of the dividend $y_o$ is delivered to the gate of the transistor 346 while the complement of the most significant bit of the dividend $y_o$ is delivered to the gate of the transistor 348. If either both the bit $x_o$ and the bit $y_o$, or both the bit $x_o$ and the bit $y_o$, are high, the voltage at the source of the depletion mode transistor 350 is low. If either the bit $x_o$ and the bit $y_o$ are not both high, or the bit $x_o$ and the bit $y_o$ are not both high, the voltage at the source of the transistor 350 is high. Upon delivery of a SCR $\phi$ control signal to the gate of the transistor 352, the voltage at the source of the transistor 350 is delivered to the transistors 354–360 which operate at a series connection of the inverters. The output from the source of the transistor 360 which is then delivered to the Bus $\alpha$ upon delivery of a READ DIVIDER control signal to the gate of the transistor 362. A transistor 364 is also provided which controls the feedback loop between the source of the transistor 360 and the gate of the transistor 354 by the application of a $\overline{\text{LOAD DIVIDER}}$ control signal to the gate of the transistor 364.

Figure 27:
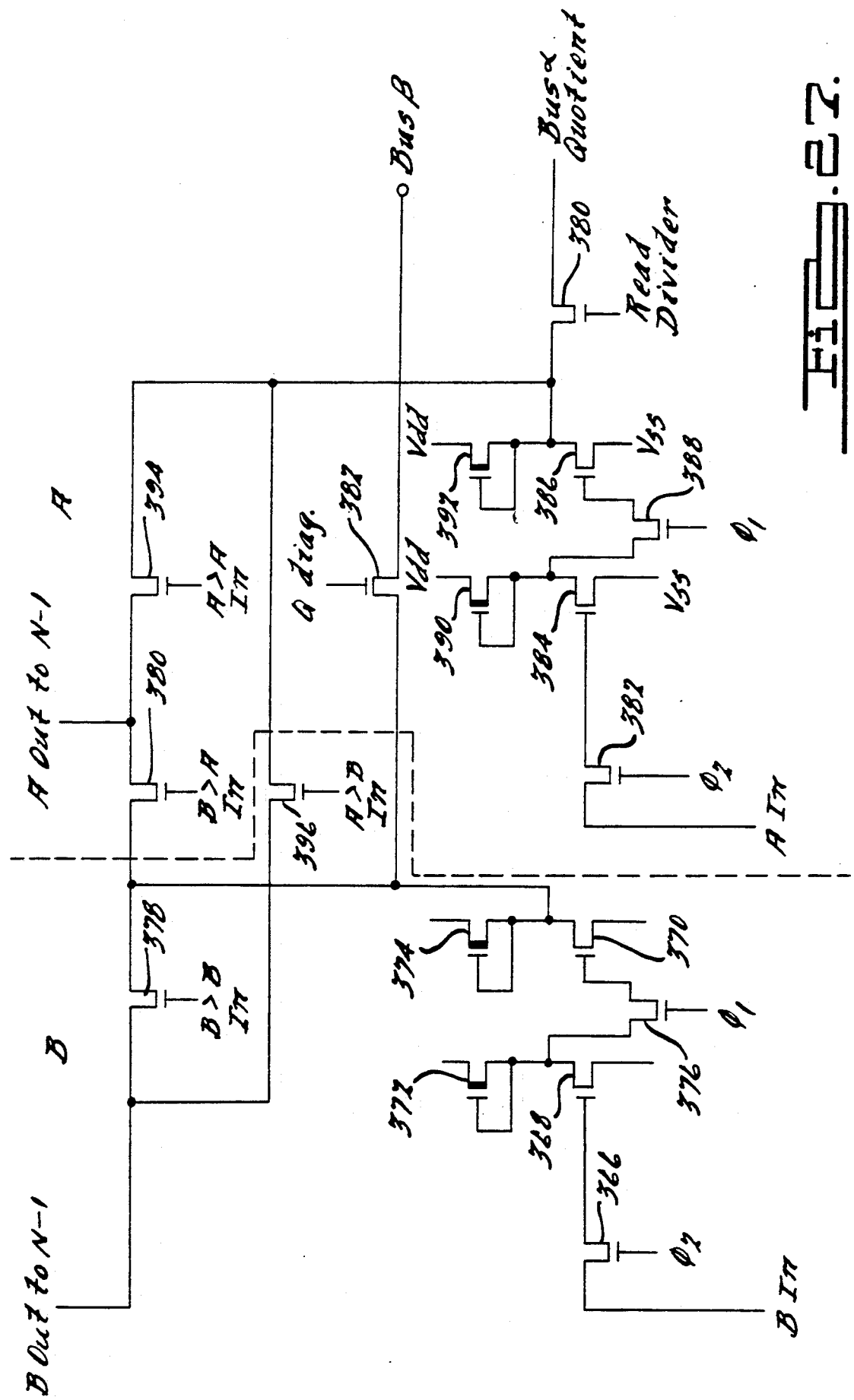
FIG. 27 is a schematic diagram of one of the two types of conversion registers shown in FIG. 2.

To implement each of the conversion registers 343 in the quotient conversion circuit 20, the circuit shown in FIG. 27 may be used. The conversion register 343 receives the output from the conversion register steering circuit 259. The signal delivered to the B input of the conversion register 343 is then delivered through the pass transistor 366 to a series of two inverters comprising the transistors 368–376. The output of the source of the depletion mode transistor 372 is delivered to the gate of the transistor 370 upon delivery of a $\phi_1$ clock signal to the gate of the transistor 376 so that the signal delivered to the B input may be amplified. The output from the source of the depletion mode transistor 374 is delivered to the drains of the transistors 378 and 380 which are used to control whether the output of the source of the depletion mode transistor 374 is delivered to the B output of the conversion register 343 or to the A output of the conversion register 343. When the output from the source of the depletion mode transistor 374 is to be delivered to the B output of the conversion register 343, a logically high signal is delivered to the gate of the transistor 378 from the source of the transistor 320 in the conversion register steering circuit 257 shown in FIG. 24. If the output from the source of the depletion mode transistor 374 is to be delivered to the A output of the conversion register 343, a high signal is delivered to the gate of the transistor 380 from the source of the transistor 336 of the conversion register steering circuit 257 shown in FIG. 25.

The signal received by the A input of the conversion register 343 is delivered to a series of two inverters comprising the transistors 384–392 through a pass transistor 382. The output from the source of the depletion mode transistor 390 is delivered to the gate of the transistor 386 upon delivery of a $\phi_1$ clock signal to the gate of the transistor 388. The output from the source of the depletion mode transistor 392 is delivered to either the A output or the B output of the conversion register 343 depending on the signal delivered to the gates of the transistors 394 and 396. If a high signal is delivered by the source of the transistor 338 of the conversion register steering circuit 257 shown in FIG. 25 to the gate of the transistor 394, the output from the source of the transistor 392 is delivered to the A output of the conversion register 343. If the logical high signal is delivered to the gate of the transistor 396 from the source of the transistor 318 of the conversion register steering circuit 257 shown in FIG. 26, the output from the source of the transistor 392 will be delivered to the B output of the conversion register 343.

To read the resulting quotient digit $q_n$ from the conversion register 343, the transistor 380 is provided. Upon receipt of a READ DIVIDER control signal by the gate of the transistor 380, the output from the source of the transistor 392 is delivered to the Bus $\alpha$. To permit evaluation of the signals delivered to the B input of the conversion registers 343 during testing, a transistor 382 is provided. Upon receipt of high $Q_{diag}$ control signal, the transistor 382 allows the output from the source of the transistor 374 to be delivered to the Bus $\beta$ which then may be recorded for testing purposes.

It should be understood that the present invention was described in connection with one specific embodiment. While the divider illustrated was shown to operate on 32 bits, it will be understood that the divider may be used to perform division on words of different length. In addition, the carry assimilation adder may comprise a larger or smaller number of full adders. Other modifications will become apparent to one skilled in the art upon a study of the specification, drawings and the claims.

What is claimed is:

1. An apparatus for generating a quotient from a dividend and a divisor by recursive subtraction operations without using carry propagation during each subtraction operation, said apparatus comprising:

means, for generating a plurality of quotient digits from said divisor and said dividend, including a division recursion circuit for performing recursive subtraction operations on said dividend;

quotient selection circuit electrically connected to said division recursion circuit for expressing each of said quotient digits as a logical zero or as a logical one with a sign; and quotient conversion circuit electrically connected to said quotient selection circuit for representing said quotient in two's complement notation.

2. An apparatus for generating a quotient from a dividend and a divisor by recursive subtraction operations without using carry propagation during each subtraction operation, said apparatus comprising:

normalizer means for determining the most significant bit of said divisor;

shifter means for locating the most significant bit of said divisor into the first bit position, said shifter means electrically connected to said normalizer means;

division recursion means for performing recursive subtraction operations on said dividend to generate a plurality of quotient digits, said division recursion means including a plurality of bit slices, each of said bit slices being able to receive one bit of said divisor and one bit from said dividend, said division recursion means electrically connected to said shifter means;

quotient selection means for expressing each of said quotient digits as a logical zero or a logical one with a sign, said quotient selection means electrically connected to said division recursion means; and quotient conversion means for generating said quotient in two's complement notation from the output of said quotient selection means.

3. The apparatus of claim 2, wherein each of said bit slices comprises a divisor register which is able to receive one bit of said divisor.

4. The apparatus of claim 3, wherein each of said bit slices comprises further a partial sum register which is able to receive one bit of said dividend.

5. The apparatus of claim 4, wherein said division recursion means further comprises a plurality of carry save adders, each of said carry save adders being disposed within one of said bit slices, at least one of said carry save adders being able to add the output of a partial sum register with the output from one of said divisor registers.

6. The apparatus of claim 5, wherein at least one of said bit slices further comprises a partial carry register, said partial carry register being able to receive carry output of one of said carry save adders.

7. The apparatus of claim 6, wherein at least one of said carry save adders receives the input from said partial carry register.

8. The apparatus of claim 2, wherein said quotient selection means comprises a carry assimilation adder.

9. The apparatus of claim 8, wherein said carry assimilation adder comprises a plurality of full adders.

10. The apparatus of claim 2, wherein said quotient conversion means comprise a conversion register data circuit which is able to receive the output from said quotient selection means and generate a quotient magnitude bit and a quotient sign bit.

11. The apparatus of claim 10, wherein said quotient conversion means further comprises a plurality of conversion registers which are able to generate said quotient in response to the output of said conversion register data circuit.

12. The apparatus of claim 11, wherein said quotient conversion means further comprises a conversion register steering circuit which is able to control the channeling of the inputs of said conversion registers to the outputs of said conversion registers.

13. A method for calculating a quotient Q from a divisor x and a dividend y, said method comprising the steps of:

delivering said divisor x and said dividend y to a division recursion circuit, said division recursion circuit operable to perform successive subtraction of partial remainders $z_n$ from said dividend y;

delivering said partial remainders from said division recursion circuit to a quotient selection circuit operable to calculate a plurality of quotient digits $q_n$ and to express each of said quotient digits as a logical zero or a logical one with a sign, said quotient selection circuit being electrically connected to said division recursion circuit, said quotient selection circuit being able to generate an output;

delivering the output from said quotient selection circuit to a quotient conversion circuit operable to generate a quotient Q in two's complement notation from said quotient digits $q_n$;

whereby said quotient digits $q_n$ and said partial remainders $z_n$ are generated by performing the following assignments iteratively, in which $z(o)$ is initially set equal to y and $q_o$ is initially set equal to zero:

$$q_{j+1} \leftarrow \text{SEL}(2\hat{z}(j))$$

$$z(j+1) \leftarrow 2z(j) - q_{j+1}x_j$$

where
$q_j$ is the $j^{th}$ quotient digit,
$z(j)$ is the $j^{th}$ partial remainder,
SEL is a quotient digit selection function given by the equation:

$$q_{j+1} = \begin{cases} 0 \text{ if } -\tfrac{1}{2} \leq 2\hat{z}(j) < \tfrac{1}{2} \\ \text{sign} \times 1 \text{ otherwise} \end{cases}$$

$$\text{sign} = \begin{cases} + \text{ if sign } z(j) = \text{sign } x_j \\ - \text{ if sign } z(j) \neq \text{sign } x_j \end{cases}$$

$2\hat{z}(j)$ is the $j^{th}$ partial remainder shifted to the left by one bit and truncated to 4 bits including sign; and whereby the value of the quotient Q is determined from a vector A having components determined by performing the following steps iteratively:

$$A[1] = \begin{cases} +\tfrac{1}{2}(0.1) \text{ if } q_1 = +1 \\ -\tfrac{1}{2}(1.1) \text{ if } q_1 = -1 \end{cases}$$

$$B[1] = \begin{cases} +0(0.0) \text{ if } q_1 = +1 \\ -1(1.0) \text{ if } q_1 = -1 \end{cases}$$

$$A[k+1] = \begin{cases} A[k] + 2^{-(k+1)} \text{ if } q_{k+1} = 1 \\ A[k] \text{ if } q_{k+1} = 0 \\ B[k] + 2^{-(k+1)} \text{ if } q_{k+1} = -1 \end{cases}$$

where M is the number of iterations used to obtain Q.

14. The method of claim 13, comprising the additional step of determining the most significant bit of said divisor x.

15. The method of claim 14, further comprising the additional step of locating the most significant bit of said divisor x in the first bit position of said divisor x.

* * * * *